Feb. 26, 1957 W. R. BEALL 2,782,577
APPARATUS FOR HANDLING ARTICLES
Filed Dec. 5, 1955 4 Sheets-Sheet 1

INVENTOR.
WILLIAM R. BEALL
BY
Fred N. Schwend
ATTORNEY

Feb. 26, 1957 W. R. BEALL 2,782,577
APPARATUS FOR HANDLING ARTICLES
Filed Dec. 5, 1955 4 Sheets-Sheet 2

INVENTOR.
WILLIAM R. BEALL
BY
Fred N. Schwend
ATTORNEY

Feb. 26, 1957 W. R. BEALL 2,782,577
APPARATUS FOR HANDLING ARTICLES
Filed Dec. 5, 1955 4 Sheets-Sheet 4
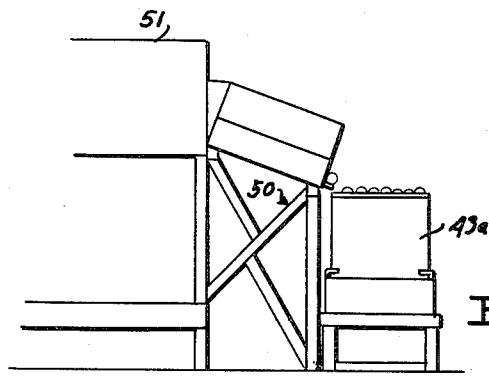
FIG. 7.
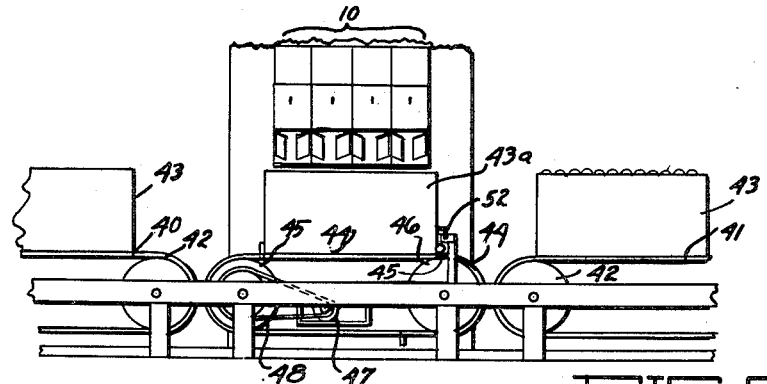
FIG. 8.
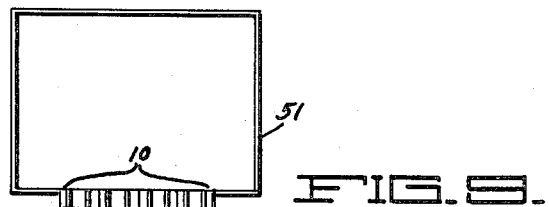
FIG. 9.
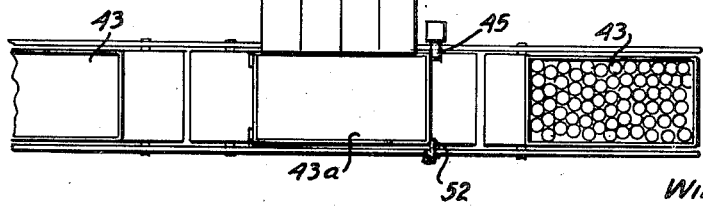
INVENTOR.
WILLIAM R. BEALL
BY
ATTORNEY

United States Patent Office 2,782,577
Patented Feb. 26, 1957

2,782,577

APPARATUS FOR HANDLING ARTICLES

William R. Beall, Glendale, Calif., assignor of one-half to Raymond Bannister, Santa Paula, Calif.

Application December 5, 1955, Serial No. 550,972

12 Claims. (Cl. 53—59)

This invention relates to apparatus for handling and packaging articles, and has particular reference to apparatus for handling and packaging relatively fragile fruit such as oranges, grapefruit, lemmons, etc.

The principal object of the present invention is to provide an accurate and reliable apparatus for filling containers with a predetermined number of articles.

Another object is to provide an apparatus of the above type which will handle articles of varying sizes.

Another object is to provide an apparatus for filling containers with predetermined numbers of fragile articles, such as fruit, without damaging the fruit during the handling process.

Another object is to provide a container filling apparatus of the above type which is capable of operating at high speeds.

A further object is to provide an apparatus of the above type in which the number of articles to be placed in each container may be predetermined and easily changed.

The manner in which the above and other objects of the invention are accomplished will be readily understood on reference to the following specification when read in conjunction with the accompanying drawings, wherein:

Fig. 7 is an end view of apparatus comprising a battery of counters for filling boxes with predetermined numbers of fruit.

Fig. 8 is a side view of the box filling apparatus.

Fig. 9 is a plan view of the box filling apparatus.

Figure 1:
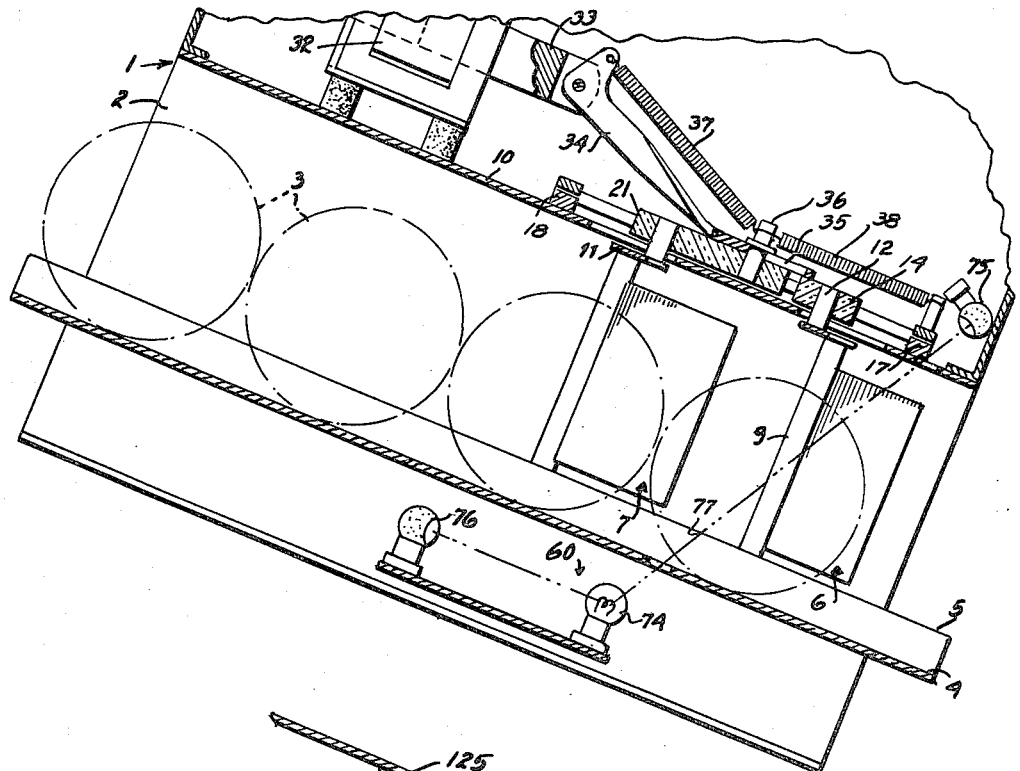
Fig. 1 is a longitudinal sectional view through a fruit counter embodying part of the present invention, and is taken substantially along the line 1—1 of Fig. 3.

Describing first the construction of the fruit counter, as shown particularly in Figs. 1 through 5, the latter comprises a casing 1 having a longitudinally extending passage 2 therein, through which articles such as oranges indicated by dot dash lines 3 are guided. The counter is placed in an inclined position as shown in Fig. 1 so that the oranges may roll forwardly along a guideway formed by a floor member 4 and rails 5 under the influence of gravity.

The movement of the oranges along the passage 2 is controlled by forward and rear gates generally indicated at 6 and 7, respectively.

Each gate comprises two shutters 7 and 8. Each shutter is mounted on a vertically extending post 9 pivoted at its lower end in a bearing formed in the floor member 4 and at its upper end in a bearing formed in a partition 10 forming the ceiling of the passage 2. Each post has secured thereto at its upper end an arm 11 having an upwardly extending stud 12 which passes through an opening in the partition 10. The studs 12 associated with the forward gate are embraced by a slot 13 formed in a slide 14 which is slidable along rail rods 15 and 16. The latter are secured at their opposite ends to supports 17 and 18 mounted on the partition 10.

The studs 12 associated with the rear gate 7 are embraced by a slot 20 formed in a second slide 21, also slidable along the rods 15 and 16.

Figure 2:
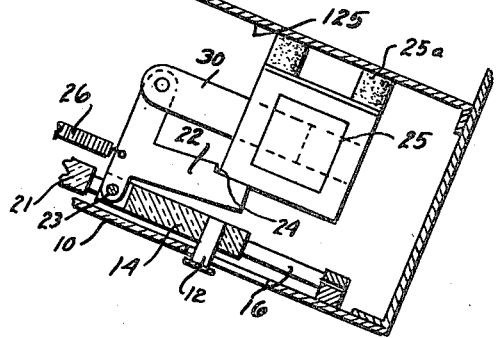
Fig. 2 is a sectional view of the forward gate operating mechanism, and is taken along the line 2—2 of Fig. 3.
Figure 3:
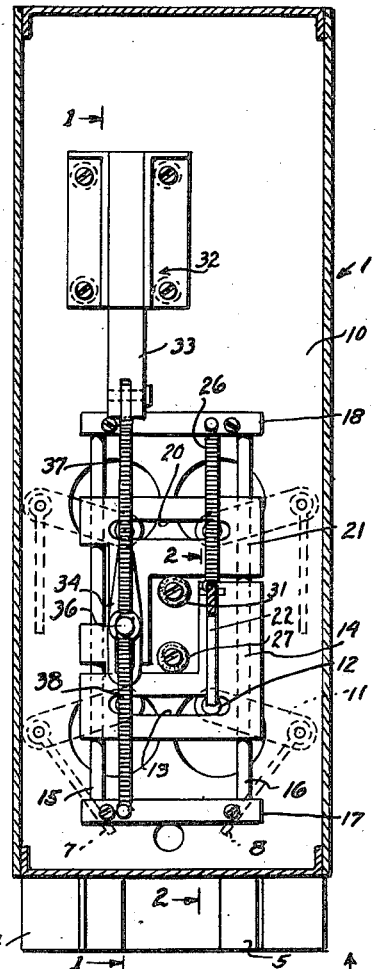
Fig. 3 is a sectional plan view of the counter.
Figure 5:
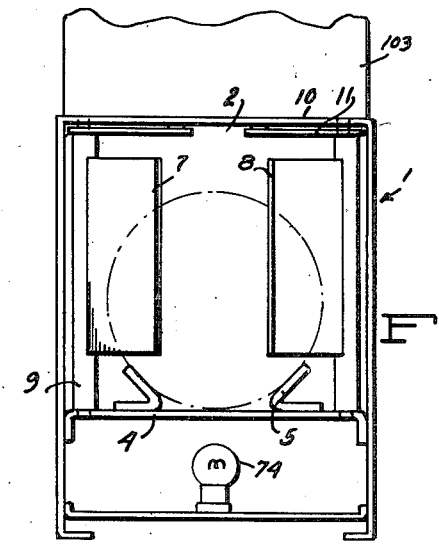
Fig. 5 is an end view taken in the direction of arrow 5 of Fig. 3.

Referring particularly to Fig. 2, the slide 14 is normally latched in a position blocking the forward gate 6 from moving from its closed position as shown in Fig. 3, by a latching device comprising a latch 22. The latter is pivoted at 23 on the slide 14 and has a latching shoulder 24 engageable with the frame of forward gate actuating solenoid 25. The solenoid 25 is supported from a second partition 125 by resilient mounts 25a. A tension spring 26 extending between the latch 22 and a pin on the support 18 normally holds the lach in latching position and at the same time holds the slide 14 at the extreme left of its movement.

When the forward gate is in its normal closed position the slide 14 is held by the spring 26 against a rubber bumper 27 mounted on the partition 10, which bumper cushions the slide 14 and gate against abrupt stopping when the gate is intermittently closed during the fruit counting operation.

Figure 4:
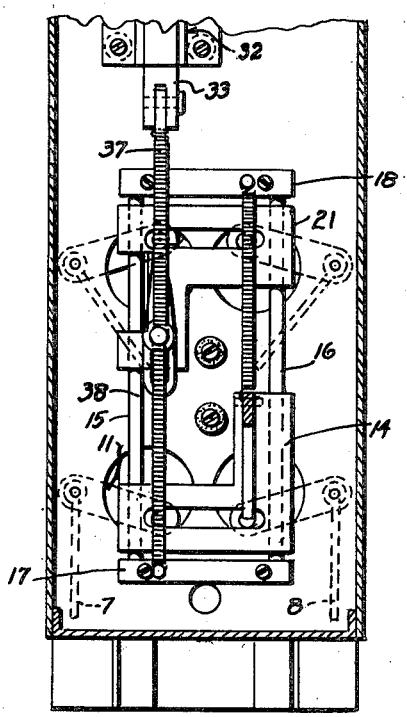
Fig. 4 is a sectional view similar to Fig. 3, but with parts broken away, and showing the gates in positions to which they are moved by the actuator solenoids.

When the solenoid 25 is energized, its armature 30 which is pivotally connected to the upper end of the latch 22, is first actuated to rock the latch to releasing position. When the latch engages the top surface of the slide 14, further movement of the armature will pull the slide to the right in Fig. 2 against the action of spring 26, thus moving the forward gate shutters 7 and 8 to their open positions, as shown in Fig. 4, thereby permitting any orange previously blocked by the gate to proceed down the guideway.

The rear gate shutters are normally held in their open positions, shown in Fig. 3, wherein the slide 21 engages a second rubber bumper 31. The slide 21 is movable to the left in Fig. 1 to close the gate 7 by a second solenoid generally indicated at 32. The armature 33 of the solenoid is pivotally connected to the upper end of a link 34. The link has a slot 35 at the lower end thereof which embraces a post 36 secured to the slide 21. A relatively strong spring 37 is tensioned between the post 36 and the upper end of the link 34 to normally hold the post against the left hand edge of the slot 35 in the link.

The slide 21 is normally held in its right hand position whereby to maintain the rear gate 7 in open position by a spring 38 extending between the post 36 on the slide 21 and a second post mounted on the rail support 17. This spring is somewhat weaker than spring 37.

Thus, when the solenoid 32 is energized the slide 21 will be moved to the left in Fig. 1, swinging the shutters of the rear gate 7 to their closed position (shown in Fig. 4) to block the passage of oranges therethrough. However, in the event that an orange should be caught directly between the two shutters, regardless of its size, the spring 37 will yield as the solenoid armature 33 moves into its fully actuated position thus preventing damage to the fruit.

Describing now the box filling apparatus shown in Figs. 7 to 9, endless conveyor belts 40 and 41 carried on motor driven pulleys, two of which are shown at 42, transport the boxes, as at 43, to and from the loading station. Here, a short endless conveyor belt 44 is provided, the latter being carried by pulleys 45 and 46. The roller 45 is yieldably driven by a motor 47 through a belt and pulley arrangement 48 and a suitable slip clutch (not shown). The belt 44 thus normally holds a box 43a supported thereby at the loading station against a stop 45 normally located in box blocking position. In this position of the box 43a, it is located directly below a battery 10 of four counters all similar to the construction shown in Figs. 1 to 5. The latter are supported in juxtaposition to each other by a suitable framework 50 in inclined positions with their outlet ends located directly over the box 43a at the loading station. The upper ends of the counters open into a suitable orange supply hopper, generally indicated at 51, which is effective to continuously feed oranges into the inlet ends of the various counters.

Figure 6:
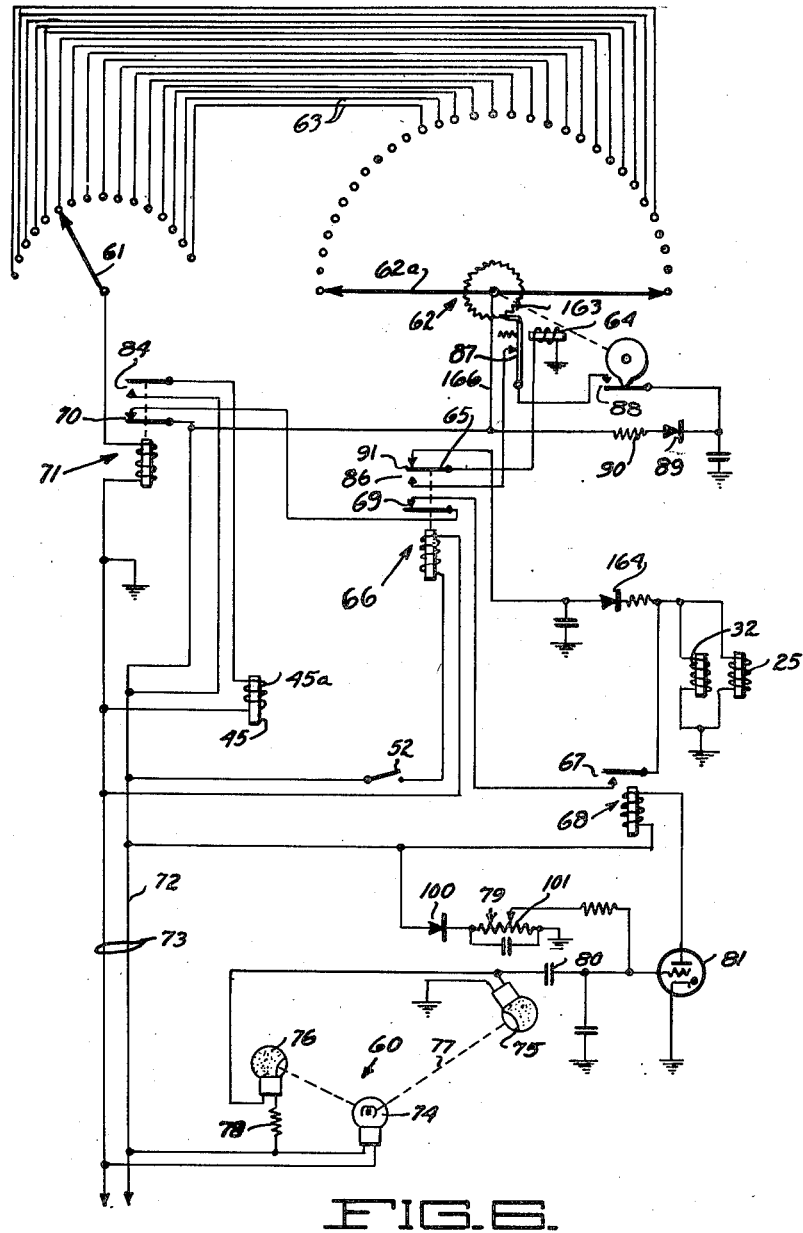
Fig. 6 is a schematic diagram of the wiring circuit for the counter.

A normally closed electric switch device generally indicated at 52, see also Fig. 6, is supported in the path of the boxes and is moved to open condition by a box when the latter reaches the loading station.

Operation of the gate control solenoids 25 and 32 in each counter (see also Fig. 6) is under the conjoint control of the switch 52, a photoelectric fruit controlled system generally indicated at 60, and a presettable count switch 61. Such controls are individual to their respective counters so that each counter may be individually controlled.

Certain of the contacts of the switch 61 are wired to certain of the contacts of a single deck stepping switch 62 through leads 64. The stepping switch is of conventional design, having a switch blade 62a which is intermittently advanced from one contact to the next by a pawl and ratchet device 163 actuated by a stepping magnet 64. The magnet 64 has its coil connected in circuit between ground and the upper movable blade 65 of a "reset counter" relay 66.

It will be noted that the solenoids 25 and 32 are connected in parallel in a series circuit comprising ground, solenoids 25 and 32, normally open contacts 67 of a solenoid actuating relay 68, normally closed contacts 69 of relay 66, normally closed contacts 70 of an "end of preset count" relay 71 to the right hand line 72 of an alternating current power supply circuit 73. The other line of the power circuit is connected to ground.

The photoelectric cell system 60, Figs. 1 and 6, comprises a lamp 74 which is mounted below the floor member 4 and projects a beam of light 77 through aligned openings in the floor member and partition 10, onto a photoelectric cell 75 when no orange is located in the forward gate. The lamp 74 also continually eliminates a guard photoelectric cell 76, located below the floor member 4.

It will be noted that the light beam 77 extends at an angle to the direction of movement of the oranges so that any bouncing of an orange as it strikes the shutters of gate 6 will normally be ineffective to unblock the light beam 77 after it has been once cut off by the orange and until the gate opens to pass the orange.

As shown in Fig. 6, the two photoelectric cells 75 and 76 are connected in a series circuit including a relatively high resistance 78 of, for example, 500,000 ohms connected between the power line 72 and ground. The juncture line between the two photocells is connected through a coupling condenser 80 to the ignitor of a thyratron type gas tube 81, such as the type known in the trade as the RCA #5823 cold cathode tube. The anode of the tube 81 is placed in series with the coil of the solenoid actuating relay 63 and connected to the power lead 72.

The internal resistance of each of the photoelectric cells 75 and 76 is relatively lower than that of the resistance 78, being, for example, approximately 10,000 ohms each when the cell is illuminated.

An ignitor biasing circuit 79, including a rectifier 100 and potentiometer 101, is connected between the power lead 72 and the ignitor of tube 81, and is normally set to apply such a bias that, when both photocells are illuminated, the tube 81 will be in non-conducting condition. When an orange interrupts the light beam 77, however, the internal resistance of the cell 75 will be increased, transmitting an increase in potential through the condensor 80 to ignite the tube. The relay 68 will now energize to close its contact 67 and (assuming the relays 66 and 71 to be de-energized) will establish a circuit from power lead 72, contacts 70, 69, 67, through the solenoids 25 and 32 to ground to pass an orange through the counter. At the same time a circuit will be established from contacts 67, through rectifier 164, normally closed contacts 91 of the relay 66 to the stepping magnet 64 to advance the switch 62.

In the event the lamp 74 should burn out or otherwise not illuminate the cells 75 and 76, the internal resistance of the cell 76 will be increased so that a positive pulse will not be generated to fire the tube 81 even though an orange moves to a position located in the path of beam 77. This safeguard, therefore, arrests operation of the counter in the event the lamp 74 should burn out or otherwise fail to illuminate.

The switch 61 of each counter is normally preset to a position indicative of the number of oranges to be passed through the counter and into a box. Hence, the stepping switch advances once for each orange passing through the counter, and when the switch arm 62a reaches the contact which is in circuit with the preset arm of switch 61, a circuit will be completed from power line 72, through line 166, switch arm 62a, lead 63, switch arm 61 and relay 71 to ground. Normally open contacts 84 are now closed completing a circuit through a solenoid 45a of the aforementioned box stop 45 (see also Fig. 9), thereby withdrawing the yieldably driven conveyor belt to move the box to the right, onto the conveyor belt 41 where it is removed from the loading station.

As the now filled box moves past the switch device 52, and before the next box comes into the loading station, the switch 52 closes to energize the relay 66. Contacts 69 of the latter now open to break the circuit to the contacts 67 of the relay 68, thus preventing operation of the gates. At the same time normally open contacts 86 of the relay 66 close, completing a circuit from ground, through the stepping magnet 64, contacts 86, self-interrupting contacts 87, off-normal contacts 88 (which are held closed until the switch arm 62a reaches its home position), a rectifier 89 and resistance 90 to the power lead 72. Thus, the stepping switch will step around to its illustrated home position where the off-normal contacts 88 will open the above circuit.

When a new box reaches the loading station it will reopen the switch 52, allowing relay contacts 69 to close, connecting the power lead 72 through relay contacts 70 and 69 to the relay contact 67. Also, contacts 91 in closing will connect the stepping switch magnet coil 64 to the contacts 67. Since the contacts 67 are now closed (assuming an orange to now be blocked by the forward gate) the stepping switch will advance to its #1 position. Concurrently, the solenoids 25 and 32 will operate the gates 6 and 7 to pass a single orange. Thereafter, as each orange passes the forward gate 6, the stepping switch will be advanced until the preset count is again reached.

The aforementioned circuitry, including the stepping switch 62, preset count switch 61 and various relays, is mounted within a compartment 103 (Fig. 5) located directly above the fruit passage 2.

Although I have described my invention in detail and have therefore used certain terms and languages herein, it is to be understood that the present disclosure is illustrative rather than restrictive and that changes and modifications may be made without departing from the spirit or scope of the invention as set forth in the claims appended hereto. For example, the apparatus may be used to handle articles other than fruit or vegetables.

Having thus described the invention, what I desire to secure by United States Letters Patent is:

1. In an apparatus for delivering articles in predetermined lots, the combination comprising a guideway for said articles, two gates for said articels spaced along said guideway, means normally maintaining a first one of said gates in closed position and the second in open position, and means responsive to movement of an article along said guideway, for moving said first gate to open position and said second gate to closed position.

2. In an apparatus for delivering articles in predetermined lots, the combination comprising a guideway for said articles, two gates for said articles, spaced along said guideways, means normally maintaining a first one of said gates in closed position and the second in open position, and means responsive to movement of an article along said guideway, for moving said first gate to open position and for yieldably moving said second gate to closed position, said last mentioned means being effective to thereafter yieldably move said first gate to closed position and said second gate to open position.

3. In an apparatus for delivering articles in predetermined lots, the combination comprising a guideway for said articles, two gates for said articles spaced along said guideway, means normally maintaining a first one of said gates in closed position and the second in open position, means responsive to movement of an article along said guideway for moving said first gate to open position and said second gate to closed position, and means responsive to movement of a predetermined number of articles along said guideways for disabling said last mentioned means.

4. In an apparatus for delivering articles in predetermined lots, to a container, the combination comprising a guideway for said articles, two gates for said articles spaced along said guideway, means normally maintaining a first one of said gates in closed position and the second in open position, means for locating a container in position to receive said articles after passing through said first gate, normally disabled means responsive to movement of an article along said guideway for moving said first gate to open position, and means responsive to location of said container in said position thereof for enabling said last mentioned means.

5. In an apparatus for delivering articles in predetermined lots, the combination comprising a guideway for said articles, two gates for said articles spaced along said guideway, means normally maintaining a first one of said gates in closed position and the second in open position, means responsive to movement of an article along said guideway for moving said first gate to open position and said second gate to closed position, a step by step device controlled by said last mentioned means and movable from one poition to a next in response to movement of an article through said guideway, and means controlled by said device upon movement thereof to any predetermined one of a plurality of said positions to disable said gate moving means.

6. In an apparatus for delivering articles in predetermined lots to a container, the combination comprising a guideway for said articles, two gates for said articles spaced along said guideway, means normally maintaining a first one of said gates in closed position and the second in open position, means for locating a container in position to receive such articles after moving through said first gate, normally disabled means responsive to movement of an article along said guideway for moving said first gate to open position and said second gate to closed position, means responsive to location of a container in said position thereof for enabling said last mentioned means, a step by step device controlled by said gate moving means, said device being movable from one position to the next in response to movement of an article along said guideway, and means controlled by said device upon movement thereof to a predetermind one of a plurality of said positions thereof for disabling said enabling means.

7. In an apparatus for delivering articles in predetermined lots, the combination comprising a guideway for said articles, two gating devices for said articles spaced along said guideway, means normally latching a first one of said gating devices in closed position, means normally maintaining a second one of said devices in open position, means for moving said first device to open position and for moving said second device to closed position, and means thereafter responsive to movement of an article along said guideway and past said second device for yieldably closing said second device and opening said first device.

8. In an apparatus for delivering articles in predetermined lots, the combination comprising a guideway for said articles, two gating devices for said articles spaced along said guideway, spring means for moving a first one of said devices to closed position, spring means for moving a second one of said devices to open position, an electromagnetic means for moving said first device to open position and said second device to closed position, and means responsive to movement of an article to a position adjacent said first gating device for energizing said electromagnetic means.

9. In an apparatus for delivering articles in predetermined lots, the combination comprising a guideway for said articles, two gating devices for said articles spaced along said guideway, spring means for moving a first one of said devices to closed position, a latch for normally latching said first device in closed position, spring means for moving the second one of said devices to open position, an electromagnetic means for releasing said latch and for thereafter moving said first device to open position and said second device to closed position, and means responsive to movement of an article along said guideway for energizing said electromagnetic means.

10. In an apparatus for delivering articles in predetermined lots, the combination comprising a guideway for said articles, a gating device for said articles, a latch for latching said gating device in closed position, spring means for moving said device to closed position, and an electromagnetic means responsive to movement of an article along said guideway for first releasing said latch and thereafter opening said gating device.

11. In an apparatus for delivering articles in predetermined lots, the combination comprising a guideway for said articles, a gating device for said articles, a latch means for normally latching said gating device against opening, said latch means including a latch part pivotally mounted on said device; yieldable means for concurrently holding said latching part in latching condition and for maintaining said gating device in closed position, and a device for moving said latching part to released position and for moving said latching part to open said gating device.

12. In an apparatus for delivering articles in predetermined lots, the combination comprising a guideway for said articles, a gate on said guideway, a spring for moving said gate to open position, and power means for moving said gate to closed position, said power means including a lost motion connection and a second spring of greater strength than said first mentioned spring for moving said gating device relative to said lost motion connection.

References Cited in the file of this patent

UNITED STATES PATENTS

| | | |
|---|---|---|
| 1,855,767 | Neuman | Apr. 26, 1932 |
| 2,536,516 | Peterson | Jan. 2, 1951 |
| 2,590,823 | Rhodes | Mar. 25, 1952 |